United States Patent
Orysh et al.

(10) Patent No.: US 10,874,011 B1
(45) Date of Patent: Dec. 22, 2020

(54) COMMUNICATION INTERFACE FOR FRONT PANEL AND POWER MODULE

(71) Applicant: Amazon Technologies, Inc., Seattle, WA (US)

(72) Inventors: Mitchell Theodore Orysh, Saratoga, CA (US); Pushkaraksha Gejji, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/385,684

(22) Filed: Apr. 16, 2019

Related U.S. Application Data

(63) Continuation of application No. 15/633,693, filed on Jun. 26, 2017, now Pat. No. 10,334,702.

(51) Int. Cl.

| | |
|---|---|
| *G05F 1/00* | (2006.01) |
| *H05B 37/02* | (2006.01) |
| *H05B 39/04* | (2006.01) |
| *H05B 41/36* | (2006.01) |
| *H05B 47/12* | (2020.01) |
| *H04L 29/06* | (2006.01) |
| *H04L 9/14* | (2006.01) |
| *G10L 15/30* | (2013.01) |
| *G10L 15/22* | (2006.01) |
| *H03K 17/96* | (2006.01) |
| *H02J 13/00* | (2006.01) |
| *H05B 47/19* | (2020.01) |

(52) U.S. Cl.
CPC .............. *H05B 47/12* (2020.01); *G10L 15/22* (2013.01); *G10L 15/30* (2013.01); *H02J 13/0017* (2013.01); *H03K 17/962* (2013.01); *H04L 9/14* (2013.01); *H04L 63/0428* (2013.01); *H05B 47/19* (2020.01); *G10L 2015/223* (2013.01)

(58) Field of Classification Search
None
See application file for complete search history.

(56) References Cited

U.S. PATENT DOCUMENTS 9,167,666 B1 10/2015 Billheimer et al.
10,334,702 B1 * 6/2019 Orysh ................ H05B 37/0236
(Continued)

OTHER PUBLICATIONS

Office Action for U.S. Appl. No. 15/633,693, dated Mar. 8, 2018, "Communication Interface for Front Panel and Power Module", 11 pages.

*Primary Examiner* — Anh Q Tran
(74) *Attorney, Agent, or Firm* — Lee & Hayes, P.C.

(57) ABSTRACT

This disclosure describes, in part, voice-controlled light dimmers that act as voice-controlled endpoints at which users may provide voice commands. These light dimmers include a front panel module coupled to a power module using a hardware interface. The front panel module may receive input from a user indicating commands for controlling appliances, and send communications to the power module using the hardware interface to control the appliances. In some examples, the communications involve encrypted data sent using an inter-integrated circuit (I2C) protocol using the hardware interface to an electrically isolated power module. The power provided to the appliances may be controlled by the power module of the voice-controlled light dimmer.

17 Claims, 6 Drawing Sheets

(56) References Cited

U.S. PATENT DOCUMENTS

| | | | |
|---|---|---|---|
| 2001/0000534 A1* | 4/2001 | Matulich | H05B 37/0236 |
| | | | 704/275 |
| 2004/0206609 A1 | 10/2004 | Tilley | |
| 2012/0068832 A1* | 3/2012 | Feldstein | F16M 11/041 |
| | | | 340/12.5 |
| 2014/0239843 A1* | 8/2014 | Hoang | H05B 47/10 |
| | | | 315/291 |
| 2015/0154976 A1* | 6/2015 | Mutagi | H04L 12/281 |
| | | | 704/275 |
| 2018/0182387 A1* | 6/2018 | Chua | G10L 15/22 |

\* cited by examiner

COMMUNICATION INTERFACE FOR FRONT PANEL AND POWER MODULE

RELATED APPLICATIONS

This application claims priority to and is a continuation of U.S. patent application Ser. No. 15/633,693, filed on Jun. 26, 2017, the entire contents of which are incorporated herein by reference.

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
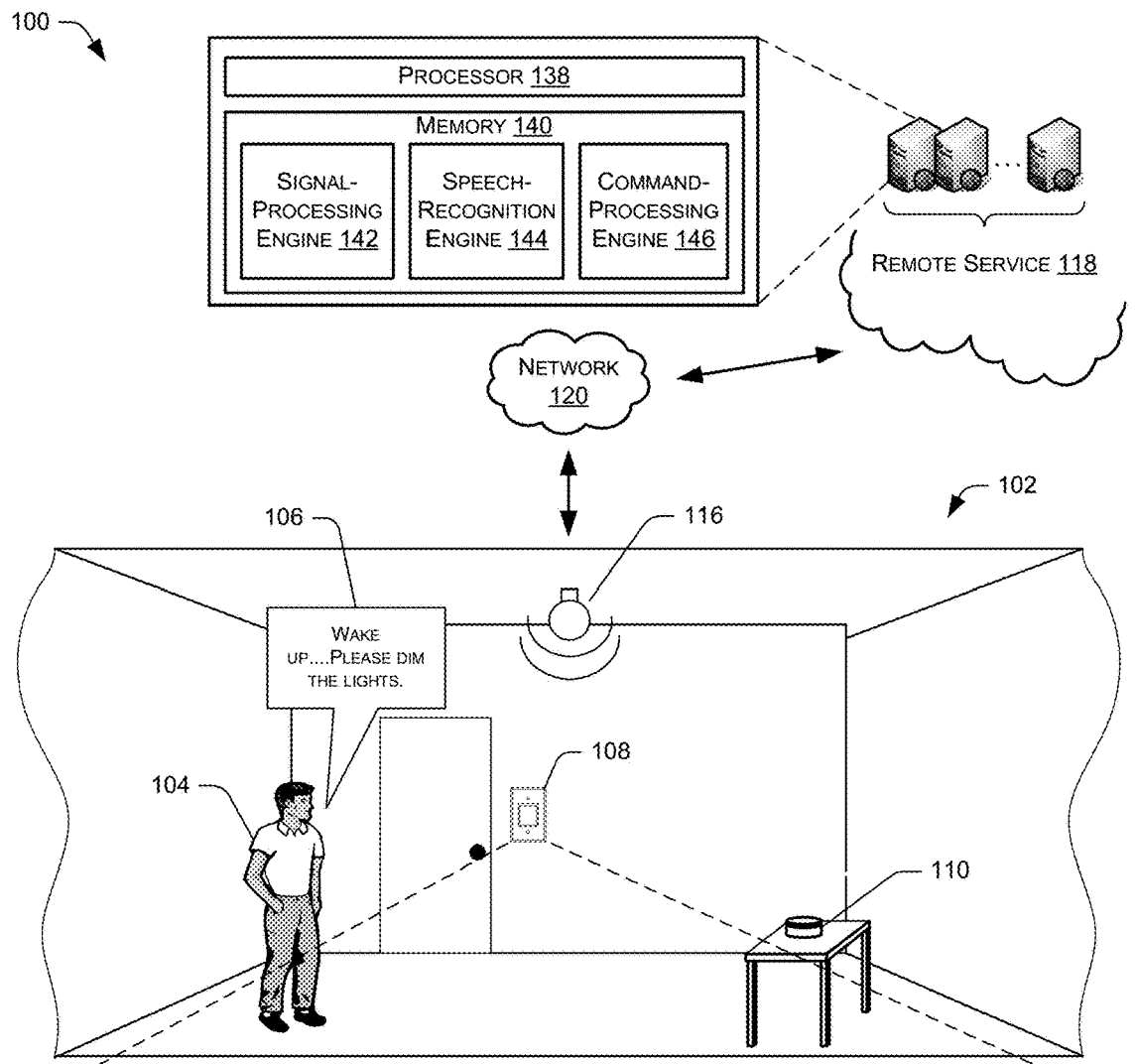
FIG. 1 shows an illustrative voice interaction computing architecture set in a home environment. The architecture includes at least one voice-controlled light dimmer and a voice-controlled device physically situated in the home, along with a user. In this example, the light dimmer includes one or more microphones for generating an audio signal that may include a command of the user, such as a command to dim the lights in the illustrated room.
Figure 1:
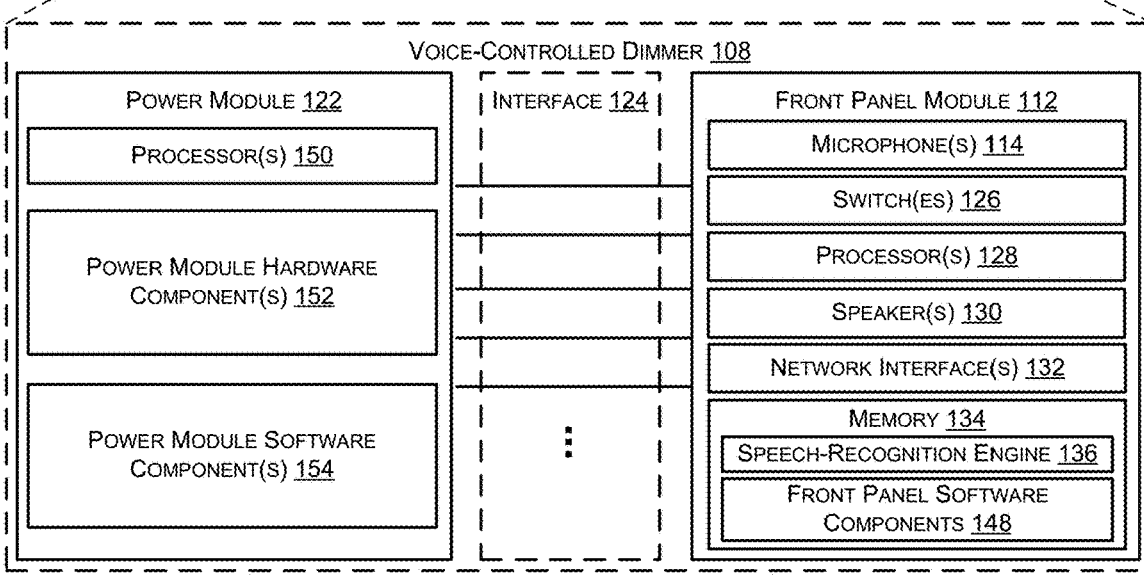

This disclosure describes, in part, voice-controlled home automation light dimmers that act as voice-controlled endpoints at which users may provide voice commands. These light dimmers may comprise a power module, which may be installed into a wall permanently to serve as a power source, and a front panel which couples to the power module via a hardware interface. The hardware interface may allow the front panel and power module to communicate, and may further allow the power module to provide power to the front panel. These light dimmers may additionally couple to one or more power loads, such as appliances (e.g., lights, outlets, home appliances, etc.). In some examples, the front panel may include various components (e.g., rotatable knob, paddle switch, sliding knob, capacitive touch sensor, etc.) to receive input regarding how a user would like to control a power load (e.g., turn on or off a light, dim or brighten a light, etc.). While the light dimmers described herein are described primarily as selectively providing power to the power loads along a spectrum of positions and power supplies, the light dimmers may also include physical components to provide power in a binary fashion (on or off). In either instance, the power loads coupled to the power modules of the light dimmers may include lights, electrical outlets, home appliances (e.g., dishwashers, washing machines, smoke detectors, security alarms, automated door locks, automated window shades, thermostats, etc.), factory machinery, healthcare devices (e.g., insulin pumps, CPAP machines, etc.), cleaning devices (e.g., autonomous robotic vacuum cleaners, etc.), or any other device that receives electrical power.

In addition to traditional light-dimmer components, the voice-controlled light dimmers described herein include one or more microphones for generating audio signals, from which one or more voice commands may be identified. For instance, a front panel of a light dimmer may include a microphone on the physical dimmer switch, on a faceplate of the front panel, and/or the like, with this microphone generating audio signals based on sound detected within the environment of the light dimmer. The front panel may perform speech recognition on the generated audio signal to identify a voice command, or the front panel may include a network interface for sending the audio signal to another device or to a remote service, which may perform the speech processing. The front panel may send instructions or commands to the power module to turn "on" or "off" power to the power loads, or increase or decrease the amount of power provided to the power loads. For example, the front panel may either determine that the voice command includes a request from a user to dim lights, or receive activation of the dimmer switch to dim the lights, and send an instruction or command to the power module to change the amount of power supplied to one or more lights based on the input the front panel received.

In some examples, the power module of the light dimmer may be permanently installed at a location, such as a wall of a home or other building. The power module of the light dimmer may receive power from a persistent power source, such as the primary alternating current (AC) power supply connected to the home or other building. The power module may convert the AC power received to direct current (DC) power, and step down the voltage to provide power to the front panel. As such, this power module may be used to power the microphones and other components of the front panel. Further, while the power module may couple to the AC power supply, in other instances the power module may couple to any other type of power source, such as batteries, capacitors, solar panels, or the like.

In some examples, the front panel and the power module may communicate using a hardware interface. The hardware interface may comprise one or more wires or pins (e.g., connections) by which the front panel and power module communicate. For example, one of the front panel or power module may have multiple female hardware connections, and the other of the front panel or power module may have multiple male hardware connections (e.g., pins, wires, etc.). In some examples, the front panel and power module communicate using various hardware interfaces having various numbers of connections, such as serial interfaces and/or parallel interfaces. The hardware interfaces may be used to communicate using various protocols, such as a Universal asynchronous receiver/transmitter (UART) protocol, a Serial Peripheral Interface (SPI) protocol, a Universal Serial Bus (USB) protocol, an inter-integrated circuit (I2C) protocol, etc. In some examples, the I2C protocol may be used to communicate using at least two connections of the hardware interface. Further, the hardware interface may further include one connection by which the power module provides power to the front panel. In some examples, the hardware interface may include other connections for performing other functions. For instance, the hardware interface may include a detect connection that the power module uses to determine if a front panel is connected to the power module. Responsive to detecting connection of a front panel using the detect connection, the power module may supply power to the front panel, or responsive to detecting disconnection of a front panel using the detect connection, the power module may stop providing power via the hardware interface. In this way, the power module may avoid having "hot" connections exposed when a front panel is not connected.

In some examples, the front panel may further be electrically isolated using one or more isolation devices. For instance, various components of the power module exposed by the hardware interface may be electrically isolated using at least one of magnetic isolation or optical isolation. This may further provide a "safe" power module to prevent potential harmful shock when a front panel is not connected to the power module.

In various examples, the power module and front panel may include one or more encryption keys and modules configured to encrypt data using the one or more encryption keys. The modules may encrypt data sent between the power module and the front panel using the hardware interface to protect the data. For example, the front panel may encrypt a command to dim a light source using the one or more encryption keys, and send the encrypted command to the power module using the hardware interface. The power module may receive the encrypted command, decrypt it using the one or more encryption keys it has stored locally, and cause the light source to dim per the command. In various instances, this may provide a manufacturer of the power module to prevent unauthorized manufacturers of front panels from using the power module. If an unauthorized front panel manufacturer does not have the one or more encryption keys, then an unauthorized front panel will be unable to communicate with the power module. In this way the power module manufacturers may prevent harmful/dangerous front panels from being installed on a power module, or unlicensed front panel manufacturers, from using the power modules.

While the techniques described above and below are primarily with respect to a light dimmer which receives input and controls an appliance using a separate power module, the techniques described herein may be utilized for any type of input device other than a light dimmer that can be coupled to a power module, and instruct the power module to perform various operations for controlling a power load. Additionally, while the techniques are described as using an I2C interface, any other type of interface (e.g., Serial Peripheral Interface (SPI) Bus Protocol, Universal Asynchronous Receiver/Transmitter (UART), etc.) may be used to perform equivalent techniques.

In some examples, the techniques described above may be utilized for other purposes other than controlling power to a load. For example, various commands may be communicated between the front panel module and the power supply, such as a command to add an item to a shopping list of a user, add a calendar appointment to a calendar of a user, record a television show for a user, etc. In such examples, the front panel module may receive the commands, such as by capturing a voice command using a microphone, and communicate the commands to the power module using the techniques described herein. The power module may then send signal to various devices to perform the commands issued by the user.

While the examples that follow describe several example configurations of microphones on a voice-controlled light dimmer, other implementations may utilize any other number of microphones located at an array of positions. In addition, these voice-controlled light dimmers may include an array of other components, such as output devices (e.g., LEDs, speakers, displays, etc.), different types of network interfaces (e.g., wired network interfaces, BLE interfaces, Zigbee interfaces, WiFi interfaces, etc.), and the like.

FIG. 1 shows an illustrative voice interaction computing architecture 100 set in a home environment 102 that includes a user 104, a voice-controlled light dimmer 108, and a user device 110. As illustrated, the user issues a voice command 106 ("Wake up . . . please dim the lights.") In some instances, the voice-controlled light dimmer 108 may include a front panel module 112 that includes one or more microphones 114 that may generate one or more audio signals for identifying the voice command and performing a corresponding action, such changing the brightness of a light 116 within the environment 102.

In some instances, the voice-controlled light dimmer 108 may identify the predefined word or phrase ("wake up") and may thereafter begin streaming one or more audio signals to another device for processing, such as to a remote service 118 comprising one or more remote devices (or "computing resources"). These remote computing resources may form a portion of a network-accessible computing platform implemented as a computing infrastructure of processors, storage, software, data access, and so forth that is maintained and accessible via a network such as the Internet. The remote computing resources do not require end-user knowledge of the physical location and configuration of the system that delivers the services. Common expressions associated for these remote computing devices include "on-demand computing", "software as a service (SaaS)", "platform computing", "network-accessible platform", "cloud services", "data centers", and so forth. Further, while FIG. 1 illustrates the remote service as being accessible over a network, in other instances the remote service/device may comprise a local hub within an environment of the voice-controlled light dimmer 108.

The remote service 118 may perform processing on these audio signals (e.g., beamforming, acoustic echo cancellation, etc.) as well as speech recognition to identify one or more voice commands, such as the voice command 106 to dim the lights 116. After identifying the voice command, the remote service 118 may send an instruction to the voice-controlled light dimmer 108 or to another device (in the environment 102 or otherwise) to perform a corresponding action. In this example, the remote service 118 may send an instruction to the light dimmer 108 to dim the light 116. In response to receiving this instruction, the voice-controlled light dimmer 108 may execute the instruction and dim the light 116. That is, the voice-controlled light dimmer 108 may cause circuitry and/or software modules of the light dimmer 108 to provide less power to the lights connected to the switch than previously being provided, without the dimmer switch moving positions (as in the case of a user manually adjusting the dimmer switch). Instead, the internal circuitry and/or software modules may change a duty cycle of a power signal being provided to the lights 116 to cause the lights 116 to dim. In other examples, the internal circuitry and/or software modules may cause the duty cycle of a power signal to change to increase the power supply to the lights 116, and thus increase the brightness of the lights 116.

In the example described above, the voice-controlled light dimmer 108 may communicate with the remote service 118 over one or more networks 120, which may comprise wired technologies (e.g., wires, USB, fiber optic cable, etc.), wireless technologies (e.g., WiFi, RF, cellular, satellite, Bluetooth, etc.), or other connection technologies. The network 120 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. In some instances, the voice-controlled light dimmer 108 may also communicate with user devices via short-range wireless communication protocols (e.g., Bluetooth, Zigbee, etc.), such as the user device 110. For instance, the voice-controlled light dimmer 108 may provide audio signals to the user device 110 or other user devices, which may in turn send the audio signals to the remote service 118 or may itself perform the processing (e.g., beamforming) and/or speech recognition. In still other instances, the voice-controlled light dimmer 108 may communicate with local user devices to send instructions to these devices. For instance, if the user 104 states a command to "turn on my kitchen television", the voice-controlled light dimmer 108 may send an instruction to do so to the kitchen television using the appropriate protocol used by the television.

As illustrated, the voice-controlled light dimmer 108 may include the front panel module 112, a power module 122, and an interface 124 to facilitate communications between the front panel module 112 and the power module 122. The front panel module 112 may include the microphone(s) 114, one or more switches 126 (e.g., a paddle switch, rocker switch, a slider, a knob, a toggle switch, etc.), one or more processors 128, one or more speakers 130, one or more network interface(s) 132, and memory 134. In some examples, the front panel module 112 may include other sensors, such as proximity sensors, to determine the presence and/or position of the user 104 in the environment. As illustrated, the memory 134 may store a speech-recognition engine 136. As described above, the speech-recognition engine 136 may function to perform speech recognition on audio signals generated by the microphones 114 to identify a predefined word or phrase, such as "wake up". After identifying this word or phrase, the front panel module 112 may begin sending one or more of the audio signals to the remote service 118 using one of the network interfaces 132.

In some examples, the front panel module 112 may include other types of input devices other than switches 126 and microphones 114. For example, the front panel module 112 may include a touch screen, a camera, a motion sensor, and/or a proximity sensor. In some instances, the input to control the power load may be received via these other input devices. For instance, a touch screen may be configured to receive touch input indicate the user would like to change an amount of power provided to a power load. Further, the camera may capture a gesture from a user, such as a thumbs up to turn on or increase the power supplied to a load, and a thumbs down to turn off a load or decrease power to a load. Additionally, the motion sensor may capture data representing a gesture of a user, such as downward motion of an arm of a user which indicates the user would like to decrease power to a load or turn off a load, and an upward motion may indicate a user would like to increase power or turn on power to a load. In this way, other types of input devices may be used to receive commands from a user to change an amount of power provided to a load by sending a command to the power module 122.

As illustrated, the remote service 118 includes one or more processors 138 and memory 140, which have access to a signal-processing engine 142, a speech-recognition engine 144, and a command-processing engine 146. In some instances, as described below, the front panel module 142 or other client devices within the environment 102 may upload audio signals to the remote service 118 for processing, given that the remote service 118 may have a computational capacity that far exceeds the computational capacity of the front panel module 112. Therefore, upon receiving audio signals from the front panel module 112, the signal-processing engine 142 may perform one or more relatively complex processing techniques on the signals to generate one or more processed audio signals. For instance, the signal-processing engine 142 may perform beamforming, acoustic-echo cancellation, background noise reduction, or other techniques to generate one or more processed audio signals having a higher SNR than the pre-processed audio signals. Furthermore, the front panel module 112 may additionally or alternatively include the signal-processing engine 142 for performing the beamforming, acoustic-echo cancellation, background noise reduction, or other techniques prior to uploading the processed audio signals to the remote service 118.

Thereafter, the speech-recognition engine 144 may perform speech-recognition on the processed audio signal(s) to identify one or more voice commands represented therein, such as the example voice command 106. Thereafter, the command-processing engine 146 may cause performance of one or more action in response to identifying the voice command. In the illustrated example, for instance, the command-processing engine 146 may issue an instruction to the front panel module 112, which in turn sends an instruction to the power module 122, to dim the light 116.

Given the above, in some instances the front panel module 112 transitions from an "asleep" state, in which the local speech-recognition engine 136 performs ASR to identify a predefined utterance, to an "awake" state, in which the front panel module 112 provides audio signals to the remote service 118 for processing and performing ASR thereon. In other instances, meanwhile, the front panel module 112 may include a selectable physical button or soft button that causes the front panel module 112 to transition from the "asleep" state to the "awake" state in response to a user selecting the button.

Furthermore, regardless of whether the speech recognition occurs locally or remotely from the environment 102, the front panel module 112 may receive vocal input from the user 104 and the front panel module 112 and/or the remote service 118 may perform speech recognition to interpret a user's operational request or command. The requests may be for essentially any type of operation, such as changing the brightness of the light 116, turning on or off appliances, adjusting appliance settings, authentication, database inquires, requesting and consuming entertainment (e.g., gaming, finding and playing music, movies or other content, etc.), personal information management (e.g., calendaring, note taking, etc.), online shopping, financial transactions, and so forth.

Thus, in some examples, the front panel module 112 may receive, from the remote service 118, data indicating that the one or more audio signals include a request (e.g., sound, speech input, etc.) from the user 104 to change an amount of power supplied to a power load connected to the power module 122. For instance, the user 104 may have requested, using command 106, that the voice-controlled dimmer 108 dim the light 116, or increase the brightness of the light 116.

In other examples, rather than receiving a voice request from the user 104 to increase or decrease the brightness of the light 116, the front panel module 112 may receive input via the switches 126 to change the brightness of the light 116. Regardless of the type of input, the memory 134 of the front panel module 112 may include one or more front panel software components 148 configured to send a command to the power module 122 upon receiving input instructing the voice-controlled dimmer 108 to change a brightness of the light 116.

In some examples, the front panel software components 148 may include encryption components configured to use one or more encryption keys to encrypt data sent between the front panel module 112 and the power module 122 using the interface 124. Thus, the front panel module 112 may send encrypted data including the instruction to change the brightness of the light 116.

The interface 124 may generally comprise one or more female connections disposed on either the power module 122 or the front panel module 112, and one or more male connections disposed on the other of the power module 122 or the front panel module 112. The male connections and female connections mate to create electrical connections between the power module 122 and front panel module 112. In some examples, the interface 124 may include at least two connections for communicating data using the I2C protocol between the power module 122 and the front panel module 112. However, as noted above, the interface 124 may include any number of connections for communicating using any protocol. Further, the interface 124 may include a connection for providing power from the power module 122 to the front panel module 112. In some examples, the interface 124 may include other connections as described in FIG. 3.

The power module 122 may include one or more processors 150, one or more power module hardware components 152, and one or more power module software components 154. The power module software components 154 may perform various operations, such as encrypting and/or decrypting data set and received between the power module 122 and the front panel module 112. The power module software components 154 may decrypt the encrypted data sent from the front panel module 112 and determine that the data includes the instruction or command to change the brightness of the light 116. The power module software components 154 may cause the power module hardware components 152 to change the brightness of the light 116.

In some examples, the power module hardware components may include circuitry, integrated circuits, and other hardware for performing various power control operations. For instance, the power module hardware components 152 may adjust the duty cycle of a power signal for the light 116 to change the brightness of the light 116. In various examples, the power module hardware components 152 may provide power to the components of the front panel module 112. In some instances, the processors 150, power module hardware components 152, and/or the power module software components 154 may comprise a microprocessor chip.

Figure 2:
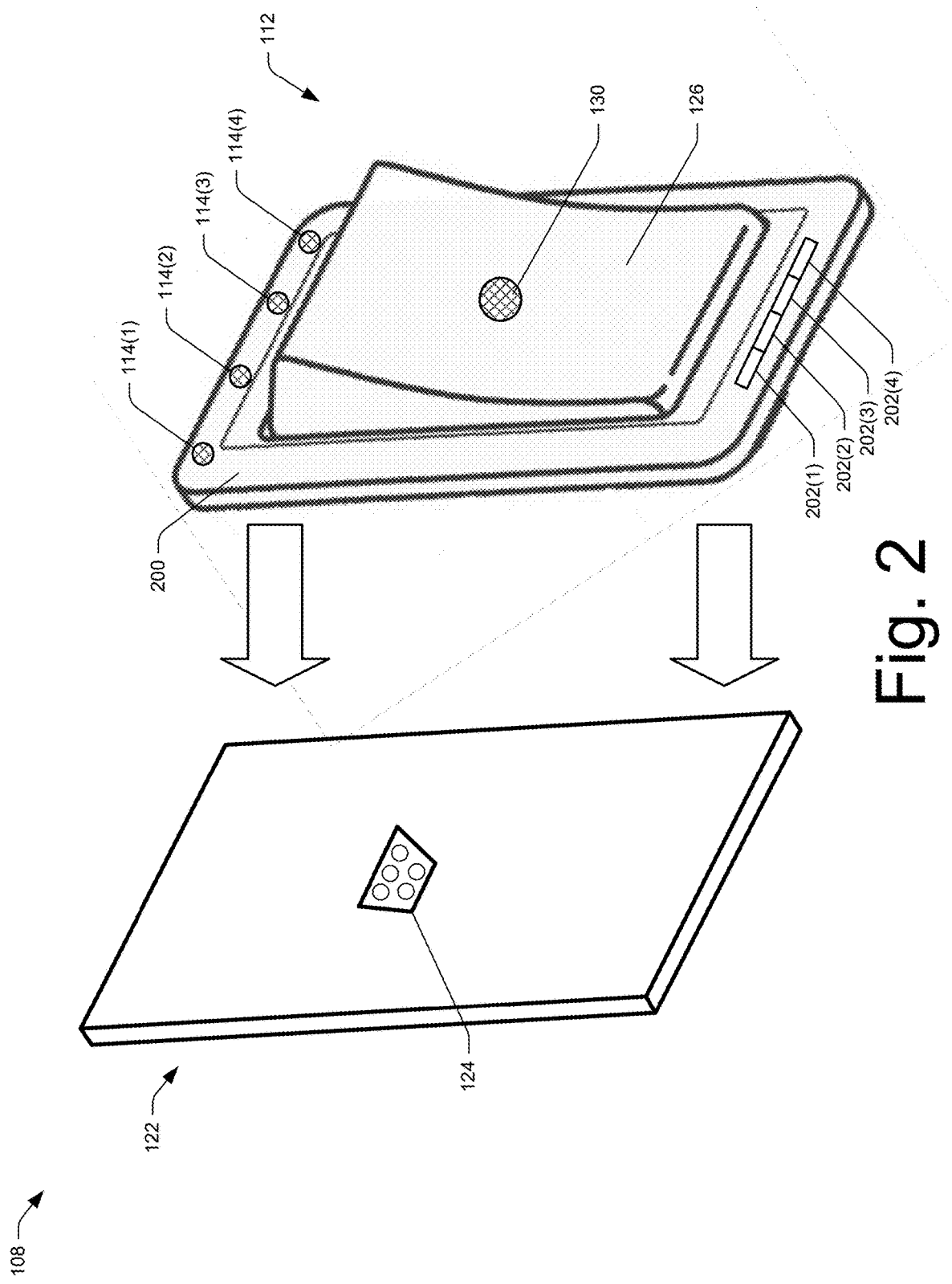
FIG. 2 illustrates an example voice-controlled light dimmer that includes a front panel module and a power module connected by a hardware interface. The front panel module may further include microphones, a switch, a speaker, and light emitting diodes. The front panel module may communicate with the power module using the hardware interface, and receive power from the power module using the hardware interface.

FIG. 2 illustrates an example configuration of the voice-controlled light dimmer 108. As illustrated, the voice-controlled light dimmer 108 includes the front panel module 112 having a housing, the power module 122, and the interface 124. The power module 122 is illustrated as having female connectors of the interface 124, and the front panel module 112 has the male connectors of the interface 124 (not shown). However, in other examples female connectors may be on the front panel module 112 and the male connectors may be on the power module 122. In even further examples, the interface 124 may not even be a male/female connectors type configuration, and can comprise any other type of hardware interface for electrically connecting the power module 122 and the front panel module 112.

The front panel module 112 may include multiple microphones 114 (e.g., 114(1), 114(2), 114(3), 114(4) . . . 114(N)) disposed on a faceplate 200 of the front panel module 112. While the microphones 114 are illustrated as four microphones disposed on a top portion of the faceplate 200, the microphones may comprise any number of microphones disposed at any location on the front panel module 112. For instance, one or more microphones may be disposed on portions of the switch 126 to provide for vertical beamforming in addition to horizontal beamforming using the microphones 114.

In some instances, the front panel 112 includes multiple microphones 114, each configured to generate a respective audio signal. Together, these multiple audio signals may be processed to generate a processed audio signal, having a signal-to-noise (SNR) ratio that is greater than the SNR ratio of any singular one of the audio signals. For instance, the light switch, or a remote service, may utilize the multiple audio signals to generate a processed audio signal using beamforming techniques, noise-cancellation techniques, or the like. The voice-controlled light dimmer, the remote service, or another device may then perform speech recognition on the processed audio signal having the increased SNR, thus increasing accuracy and efficacy of the speech recognition.

The front panel module 112 is illustrated as having a speaker 130 disposed on the switch 126. However, in other examples multiple speakers 130 may disposed anywhere on the front panel module 112.

In some examples, the front panel module 112 may include one or more light emitting diodes (LEDs) 202. The LEDs 202 may comprise multiple LEDs (e.g., 202(1), 202(2), 202(3), 202(4) . . . 202(N), etc.) disposed at any location on the front panel module 112, such as the switch 126 and/or the faceplate 200. The LEDs 202 may be configured to output light as a form of communication to a user, and/or to illuminate the voice-controlled dimmer 108, such as when the environment is dark.

As shown in FIG. 2, the front panel module 112 may be configured to be placed on, or coupled to, the power module 122, where the power module 122 may be permanently installed or fixed on a surface, such as a wall.

Figure 3:
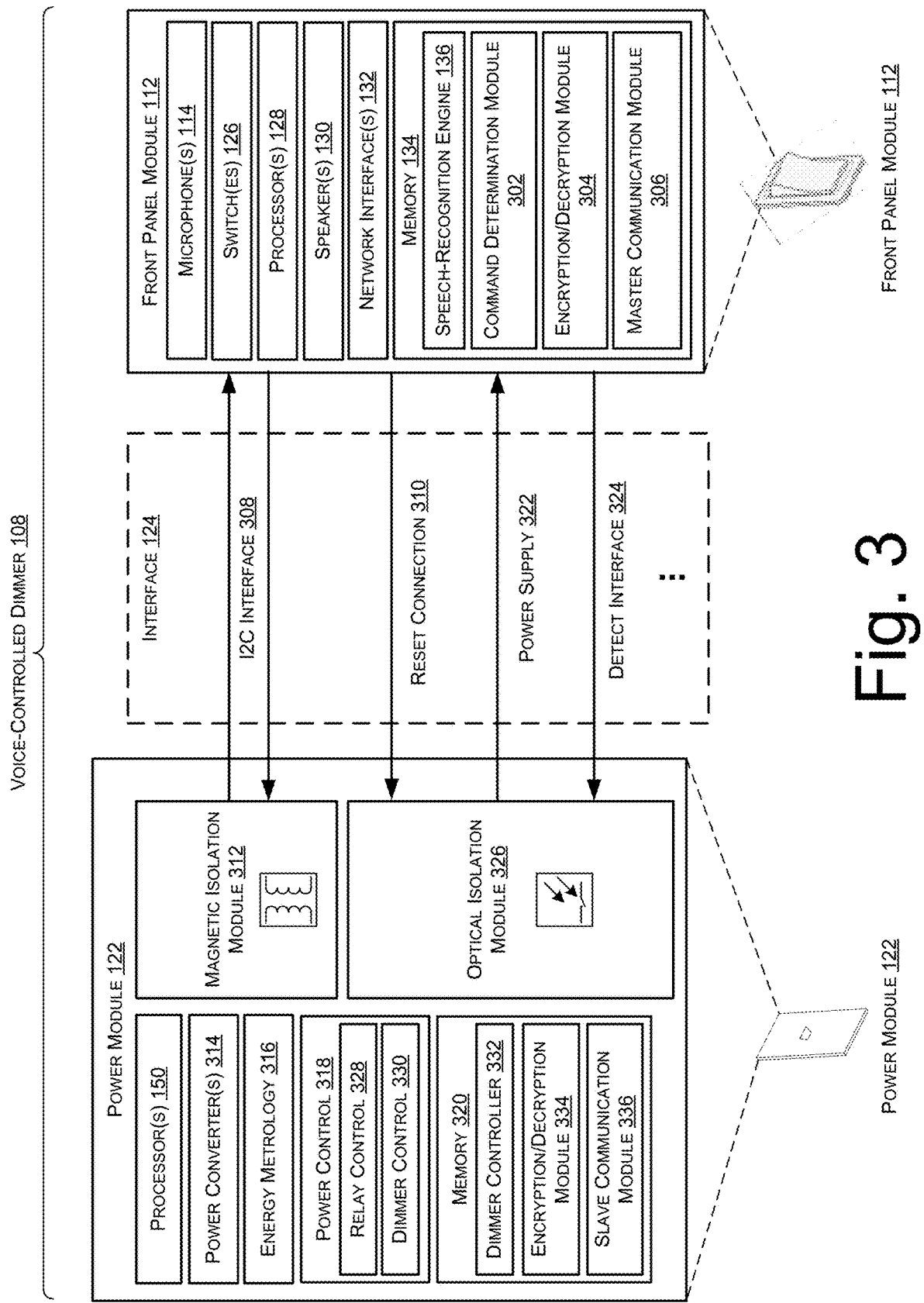
FIG. 3 illustrates an example configuration of a voice-controlled light dimmer. Here, the light dimmer includes a front panel module connected to a power module by a hardware interface.

FIG. 3 illustrates an example of the voice-controlled dimmer 108. As shown, the voice controlled dimmer 108 includes various components described in FIGS. 1 and 2, such as the front panel module 112, the interface 124, and the power module 122. The front panel module 112 may include the microphones 114, switches 126, processors 128, speakers 130, network interfaces 132, and memory 134. The memory 134 may include the speech-recognition engine 136, and may further include a command determination module 302, an encryption/decryption module 304, and a master communication module 306.

In various examples, the command determination module 302 may comprise instructions for determining what command to send to the power module 122 based on input received at the front panel module 112. For instance, the microphones 114 may receive a voice command from a user 104, and send audio signals to the remote server 118 for processing. The front panel module 112 may receive, via the network interfaces 132 (e.g., one or more antennas), data indicating that the audio signals included a request to control the power of a power load associated with the power module 122. Thus, the command determination module 302 may determine and/or generate a command to cause the power module 122 to control or change the power of the power load (e.g., light 116). In other examples, the front panel module 112 may receive input via the switches 126 (e.g., actuation of the switch to a dim position, or actuation of the switch to a bright position). The command determination module 302 may determine, based on the input received at the switches 126, a command to cause the power module 122 to control the power to the power load based on the input.

In some examples, the encryption/decryption module 304 may encrypt the command using one or more encryption keys. The encryption/decryption module 304 may encrypt the command to generate an encrypted command, or encrypted data, prior to sending data over the interface 124.

In some instances, the master communication module 306 may include instructions to send the command, or an encrypted command, via the interface 124 to the power module 122. In some instances, the master communication module 306 may send the data using the inter-integrated circuit (I2C) connections 308 of the interface 124. The I2C connections 308 may comprise two connections facilitating communications between the front panel module 112 and the power module 122. While the interface 124 is illustrated as having two connections for communications using the I2C protocol, in some examples the interface 124 may comprise any number of hardwired connections (e.g., 1, 2, 3, 4, 5, etc.) used to communicate using different protocols (e.g., UART, SPI, USB, etc.).

In some examples, the command determination module 302 may further determine to send a reset signal to the power module 122. For example, the command determination module 302 may receive instructions from the remote service 118 to send the reset signal to the power module 122, where the reset signal causes components of the power module 122 to reset. In some instances, the master communication module 306 of the front panel module 112 may place a logic high signal (or alternatively logic low when logic high is the default signal) on a reset connection 310 of the hardware interface 124. For instance, the reset connection 310 may comprise a wire, or other type of hardware connection, which has a logic high/low signal placed on it that, when detected by the power module 112, cause the power module 122 and/or processor(s) 150 to reset.

In various examples, the power module 122 may receive signals from the front panel module 112 via the interface 124. In some examples, the power module 122 may include one or more isolation modules to electrically isolate components of the power module 122 from objects exterior the power module 122. For example, a magnetic isolation module 312 may electrically isolate the power module 122 from the I2C interface 308. In some examples, the magnetic isolation module 312 may comprise a circuit including a transformer to magnetically isolate the power module 122 from the connections exterior the power module 122. In other examples, any type of electrical isolation may be used between the power module 122 and the interface 124 to allow for the power module 122 to be "hot pluggable," or safe to unplug a powered front panel module 112.

In some instances, the power module 122 may include various components, such as one or more power converters 314, an energy metrology module 316, a power control 318, and memory 320.

In some examples, the power converters 314 may convert power from various voltages and/or forms into different voltages and/or forms to power components of the power module 122 and the front panel module 112. For example, the power converters 314 may receive input power in the form of 120V of alternating current (AC), or any other type of relatively high voltage often provided to buildings (e.g., 110V AC, 240V AC, etc.). In some examples, the input power may be received from a wall outlet, or by wiring the power module 122 into a home power system. The power converters may convert the power into direct current (DC), and change the voltage from 120V into a smaller voltage (e.g., 3.5V, 5V, etc.) that is used to power the front panel module 112. For example, the power converters 314 may provide power to the front panel module 112 at roughly +5V of DC power, and power at roughly 11 Watts, using the power supply connection 322 of the interface 124. In some examples, the power converters 314 may provide different supply voltages for various components of the power module 122 and/or the front panel module 112.

In some instances, the power converters 314 may selectively provide power via the power supply connection 322. For instance, a detect interface 324 of the interface 124 may indicate whether or not a front panel module 112 is connected to the power module 122. If the detect interface 324 indicates that a front panel module 112 is connected, then the power converters 314 may provide the supply voltage to the front panel module 112. Alternatively, if the detect interface 324 does not indicate that a front power module 108 is connected to the power module 122, then the power converters 314 will not provide power via the power supply 322. In this way, "hot" connections are avoided when a front panel module 112 is not connected. In some examples, the detect interface 324 may comprise a wire, or other hardware connection, that has a logic high signal (or low signal) placed on it to notify the power module 122 that a front panel module 112 is connected. In other examples, the detect interface 324 may comprise a hardware connection which completes a circuit internal to the power module 122, which indicates that the front panel module 112 is connected. In various examples, the detect interface 324 may be used to send and receive data for the power module 122 indicating whether or not a front panel module 112 is connected, what type of module 112 is connected, or other data.

As illustrated, the power module 122 may be isolated from the reset connection 310, power supply 322, and/or detect interface 314 using various electrical isolation components, such as an optical isolation module 326. The optical isolation module 326 may provide electrical isolation using any known optical isolation techniques. However, any type of electrical isolation module may be used, such as a magnetic isolation module 312.

In some examples, the energy metrology module 316 may comprise an integrated circuit configured to report to the front panel module 112 what the load characteristics for the power loads connected to the power module 122 are. The power module 122 may be connected to one or more power load using one or more wires, and the energy metrology module 316 may monitor the load characteristics of the loads. In this way, the front panel module 112 is able to report energy usage and characteristics for the loads of the power module 122 to a mobile device associated with a user 104 and/or the remote service 118.

In various examples, the power control component 318 may include various components for controlling the power supplied to the loads for the power module 122. The power control component 318 may include a relay control 328 and a dimmer control 330. In some examples, the relay control 328 may be used to control power to certain types of power loads, such as inductive loads. In some instances, the relay control 328 can power maximum current loads of house wiring (e.g., 14-gauge wire at 15 amperes). The relay control 328 may be used to control inductive-like loads, or purely inductive and high current loads, such as loads with motors (e.g., heaters, fans, etc.). For instance, the relay control 328 may be configured to change a speed of the fan and/or the heat output by a heater based on input. Controlling loads other than a dimming light may comprises turning on or off the loads, or controlling other aspects of the loads (e.g., thermostat output, fan speed, heater output, etc.).

In various examples, the dimmer control 330 may be used to control lighting loads, such as by dimming lights. The dimmer control 330 may comprise a TRIAC-based control system (e.g., two TRIACs, four TRIACs, etc.). In other examples, the dimmer control 330 may comprise a MOSFET-based control system (e.g., two MOSFETS, four MOSFETS, etc.) to control power output to dim lights. In various examples, the dimmer control 330 may control the brightness of the light 116 using a pulse-width modulation (PWM) signal. For instance, the dimmer control 330 may swing the duty cycle of the clock for the PWM signal from 10% to 90% based on whether the instruction received from the front panel module 112 indicates a request to increase the brightness of the light 116, or decrease the brightness of the light 116. The longer the duty cycle of the PWM power signal provided to the light 116, the more power the light 116 receives, and the brighter the light 116 is (and vice-versa).

In some examples, the energy metrology module 316 may monitor at least one of the current, voltage, or power supplied to the loads controlled by the power module 122 in order to determine load characteristics. For instance, the energy metrology module 316 may determine, based on characteristics of the voltage or current supplied to the load, that the load comprises an inductive load, a capacitive load, a purely resistive load, etc. The energy metrology module 316 may determine load characteristics of the load independent of a request by a user, in some examples. The energy metrology module 316 may notify the power control component 318 of the characteristics of the load. Based on the characteristics of the load, the power control component 318 may perform various operations for modifying the power supplied to the load. For instance, the power control component 318 may be configured to perform a leading edge and/or trailing edge phase cut to the signal of the power provided to the loads to support different types of loads. As an example, a trailing edge phase cut may be applied to the power being supplied for an inductive load, and a trailing edge phase cut may be applied to the power being supplied to a capacitive load. In some examples, applying the leading edge and/or trailing edge phase cuts may increase user experience. For instance, the dimmer control 330 may have different modes depending on the type of load. In some examples, such as when the load comprises a light, a leading edge or trailing edge phase cut may be applied to the power signal to reduce flickering of the light, humming from the light, or other unwanted results due to the power being supplied, and the type of load consuming the power. Thus, the components of the power module 122 may intelligently determine a type of load that is having its power supplied by or modified by the power module 122, and change modes to apply leading edge phase cuts and/or trailing edge phase cuts to the power provided to reduce unwanted results at the load.

In some examples, the memory 320 may include a dimmer controller 332, an encryption/decryption module 334, and a slave communication module 336. The slave communication module 336 may send and receive communications with the master communication module 206 of the front panel module 112 using the I2C interface 308. The encryption/decryption module 334 may encrypt and decrypt data sent and received using the I2C interface. In some examples, the encryption/decryption module 334 may use one or more keys to encrypt and decrypt data in messages. For instance, the encryption/decryption module 334 may decrypt a message received from the front panel module 112 which indicates an instruction to change the brightness of the light 116. The dimmer controller 322 may determine how to control the dimmer control 330 integrated circuit of the power control component 318 to change the brightness of the light 116. For example, the dimmer controller 332 may determine how to swing the duty cycle of the PWM power signal which provides power to the light 116 in order to change the brightness of the light 116 according to the command received from the front panel module 112.

In various examples, the encryption/decryption module 304 and encryption/decryption module 334 may store an infrastructure of public and private keys used to validate the front panel module 112 as being authentic. For instance, every authenticated front panel module 112 (e.g., a licensed front panel module 112) may store one or more private keys used to encrypt data which can be in turn decrypted by keys stored in the encryption/decryption module 334, and vice-versa. In this way, encryption and decryption can be performed by the power module 122, and also by the front panel module 112, to ensure that communications between the modules cannot be interpreted, and to ensure that only licensed front panel module 122 manufacturers are able to interface with the power module 122.

While the techniques described herein are described with reference to changing the brightness of a light, the techniques may be applied to controlling any power consuming load controlled by the power module 122. For instance, the command received from the front panel module may comprise a command to turn on or off a television, and the power control component 318 may cause the television to turn on or off. In other examples, the commands may be unrelated to a load as well. For example, the commands may comprise a command to add an item to a shopping list of a user 104, schedule an appointment in a calendar for the user 104, call a contact of the user 104, stream music from another device of the user, and so on.

In some examples, the processor(s) 128 and 150 may include a central processing unit (CPU), a graphics processing unit (GPU), both CPU and GPU, or other processing units or components known in the art. Additionally, each of the processor(s) 128 and 150 may possess its own local memory, which also may store program modules, program data, and/or one or more operating systems.

Depending on the exact configuration and type of the voice-controlled dimmer 108, the memory 134 and memory 320 may include volatile memory (such as RAM), non-volatile memory (such as ROM, flash memory, miniature hard drive, memory card, or the like), or some combination thereof. The memory 134 and memory 320 (as well as all other types of memory or storage described herein) may include one or a combination of computer storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer storage media does not include communication media, such as modulated data signals and carrier waves. As such, computer storage media is non-transitory media.

Figure 4:
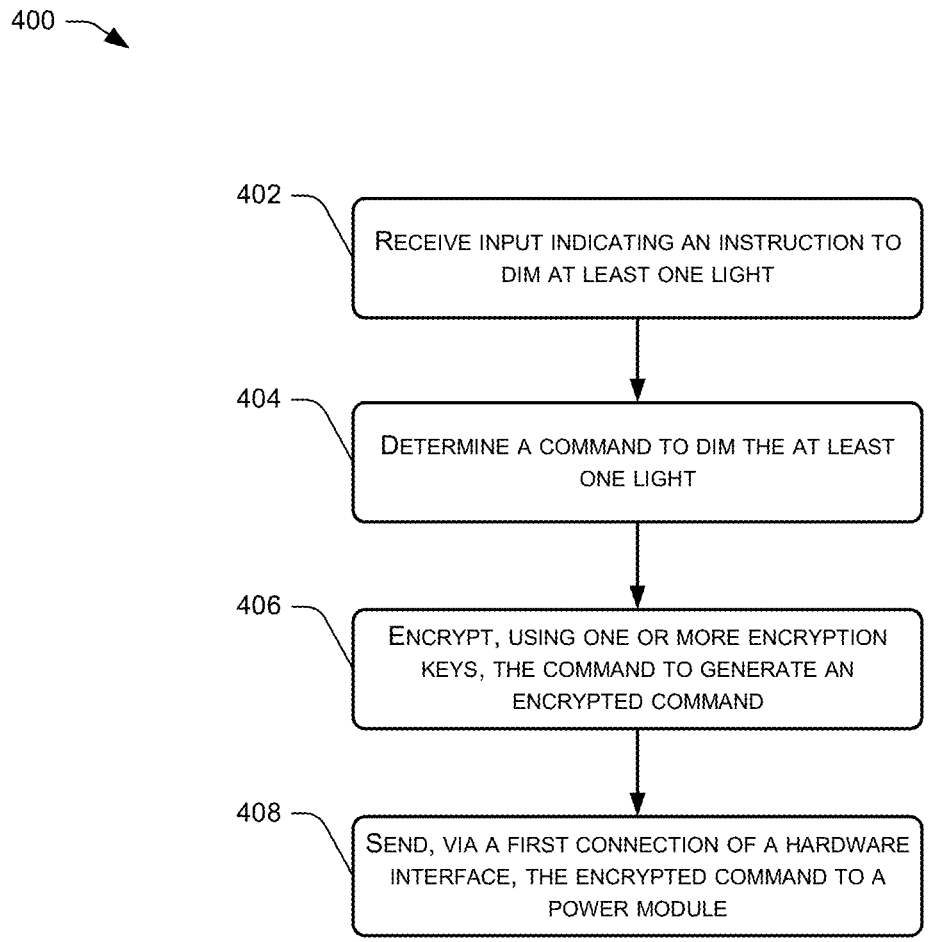
FIG. 4 illustrates a flow diagram of an example process for receiving input at a front panel module indicating an instruction to dim a light, generating a command to dim the light, encrypting the command to dim the light, and sending the encrypted command to a power module to dim the light. In some examples, receiving the input may comprise sending an audio signal to a remote service for natural language processing, and receiving, from the remote service, data indicating that the audio signal represented a request to dim the light. In other examples, receiving the input may comprise receiving an activation of a dimmer switch.

FIG. 4 illustrates a flow diagram of an example process 400 for receiving input at a front power module indicating an instruction to dim a light, determining a command to dim the light, encrypting the command to generate an encrypted command, and sending the encrypted command to the power module.

The process 400 (and each process described herein) is illustrated as a logical flow graph, each operation of which represents a sequence of operations that can be implemented in hardware, software, or a combination thereof. In some instances, some or all of the operations are executed by the components of a voice-controlled light dimmer, such as the front panel module 112 and power module 1222 of the light dimmer 108 described above. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 402, the front panel module 112 receives input indicating an instruction to dim at least one light 116. In some examples, the front panel module 112 may include a dimmer switch disposed in a faceplate of the front panel module that is configured to toggle between a brighter position (e.g., upward position) and a dimmer position (e.g., downward position), wherein a power module coupled to the front panel increases the power to the at least one light when the upward position is activated and provides less power to the at least one light when the downward position is activated. In various examples, the front panel module 112 includes a wireless network interface 132, and receiving the input indicating the instruction to dim comprises receiving an audio signal generated by a microphone 114 of the front panel module 112, sending the audio signal to one or more remote devices 118 and via the wireless network interface 132, and receiving, from the one or more remote devices 118 and via the wireless network interface 132, data indicating that the audio signal includes the instruction to dim the at least one light 116.

At 404, the front panel module 112 may determine a command to dim the at least one light 116. For example, the command determination module 302 may determine the command to dim the at least one light 116. In some examples, the command determination module 302 may receive data indicating the command from the remote devices 118. In various examples, the command determination module 302 may receive data indicating that an intent of the audio signal is to dim the at least one light 116, or otherwise control a load of the power module 122. In such examples, the command determination module 302 may identify data comprising the command to send to the power module 122 to control the load.

At 406, the front panel module 112 may encrypt, using one or more encryption keys, the command to generate an encrypted command. In various examples, the encryption/decryption module 304 may store the one or more keys and encrypt the command to generate the encrypted command.

At 408, the front panel module 112 may send, via a first connection 308 of a hardware interface 124, the encrypted command to a power module 122. In some instances, the encrypted command may be sent using an inter-integrated circuit (I2C) protocol using the first connection 308 of the hardware interface.

Figure 5:
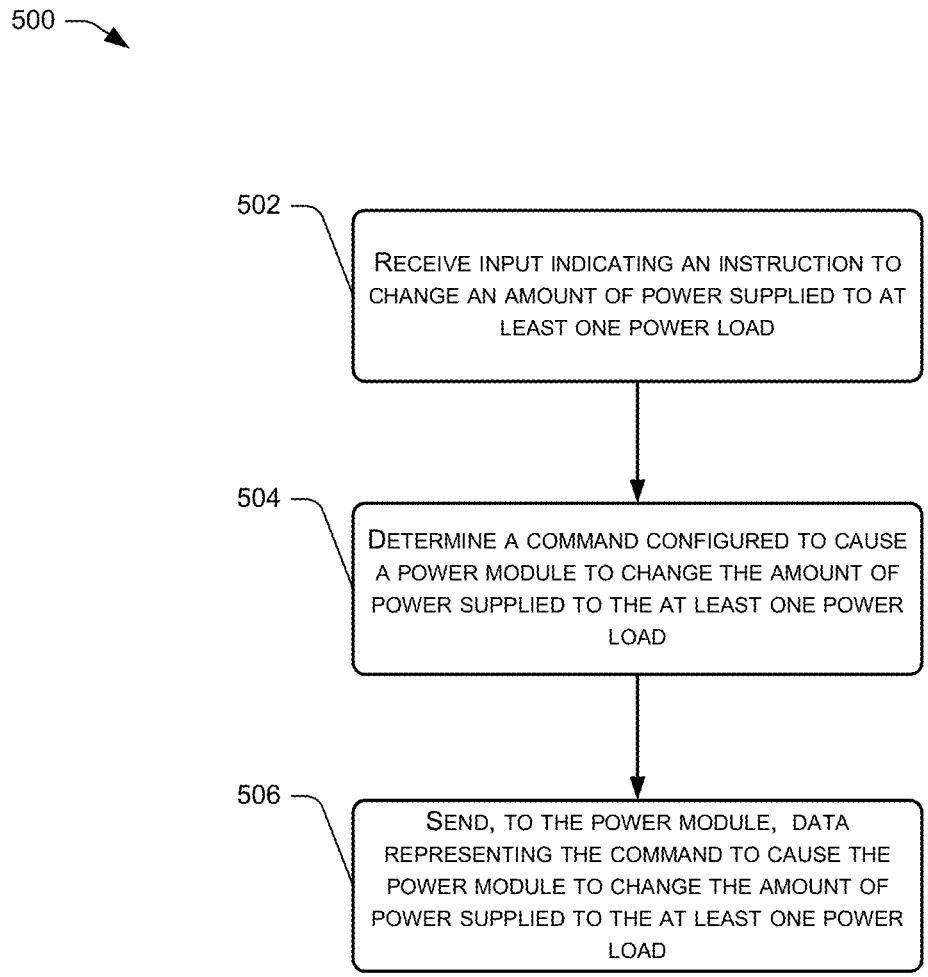
FIG. 5 illustrates a flow diagram of an example process for receiving input at an apparatus indicating an instruction to change an amount of power supplied to a power load, determining a command to cause a power module to change the amount of power, and sending the command to the power module.

FIG. 5 illustrates a flow diagram of an example process 500 for receiving input at an apparatus indicating an instruction to change an amount of power supplied to a power load, determining a command to cause a power module to change the amount of power, and sending the command to the power module.

At 502, an apparatus (e.g., front panel module 112) may receive input, via one or more input devices, indicating an instruction to change an amount of power supplied to at least one power load. In some examples, the power supplied to the power load may be controlled by a power module 122, where the apparatus is electrically coupled to the power module 122 by a hardware interface 124. In various examples, changing the power may be a binary change of power for the load (e.g., turn the load "on" or "off"), of a variable change of power for the load (e.g., change the brightness of a light 116). In some examples, receiving the input may comprise receiving, from one or more microphones of the apparatus, an audio signal representing speech input (e.g., sound) in an environment of the apparatus, sending the audio signal to one or more remote devices and via a wireless network interface of the apparatus, and receiving, from the one or more remote devices and via the wireless network interface, data indicating that the audio signal includes the instruction to change the amount of power supplied to the at least one power load. In other examples, the one or more input devices of the apparatus may comprise a dimmer switch configured to toggle between an increase power position and a decrease power position, wherein the power module provides additional power to the at least one power load when the increase power position is activated and provides less power to the at least one power load when the decrease power position is activated. In such examples, receiving the input indicating the instruction to change the amount of power supplied to the at least one power load may comprise receiving an activation of the dimmer switch.

At 504, the apparatus may determine a command configured to cause the power module to change the amount of power supplied to the at least one power load. In some examples, the command may be determined based on data received from the one or more remote devices.

At 506, the apparatus may send, to the power module 122 and via a first connection 308 of the hardware interface 124, data representing the command to cause the power module 122 to change the amount of power supplied to the at least one power load.

Figure 6:
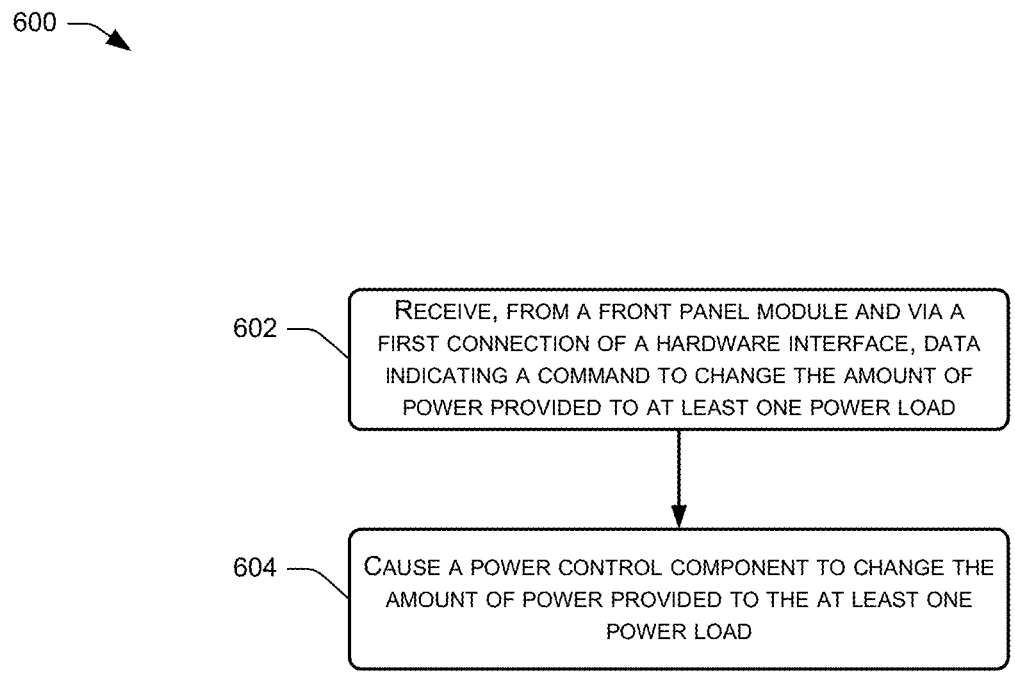
FIG. 6 illustrates a flow diagram of an example process for receiving a command to change an amount of power provided to a power load, and causing a power control component to change the amount of power provided to the power load.

FIG. 6 illustrates a flow diagram of an example process 600 for receiving a command to change an amount of power provided to a power load, and causing a power control component to change the amount of power provided to the power load.

At 602, a power module 122 may receive, from a front panel module 112 and via a first connection 308 of a hardware interface 124, data indicating a command to change an amount of power provided to a power load. In some examples, the power module 122 may be coupled to the power load via one or more wires. In some instances, the data may be received via the first connection 308 of the hardware interface 124 using an inter-integrated circuit (I2C) protocol.

In some instances, the data indicating the command may comprise encrypted data, and an encryption/decryption module 334 of the power module 122 may decrypt the encrypted data using one or more encryption keys to identify the command to change the amount of power.

At 604, the power module 122 may cause a power control component 318 to change the amount of power provided to the at least one power load. In some examples, changing the amount of power may comprise a binary change in power (e.g., turn a power load "on" or "off"), or a range in the amount of power (e.g., changing a duty cycle of a pulse-width modulation signal controlling power supplied to the load). In some instances, a relay control 328 may be used to change the amount of power, such as when the power load comprises an inductive-type load. In other examples, a dimmer control 330 may be used to change the amount of power, such as when the power load comprises a light.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A front-panel module comprising:
   a hardware interface that couples the front-panel module to a power module, wherein the front-panel module receives power from the power module;
   an input device;
   one or more processors; and
   one or more computer-readable media storing computer-executable instructions that, when executed, cause the one or more processors to perform acts comprising:
      receiving, at least partly via the input device, input indicating an instruction;
      determining that the instruction is associated with operating a secondary device;
      generating one or more packets including data that causes the power module to control the secondary device according to the instruction;
      encrypting, using one or more encryption keys, the one or more packets to generate one or more encrypted packets; and
      sending, to the power module, via the hardware interface, and using a communication protocol, the one or more encrypted packets.

2. The front-panel module of claim 1, further comprising a wireless network interface, wherein:
   the data comprises first data;
   the input device comprises a microphone;
   the input comprises speech input; and
   the acts further comprising:
      receiving, from the microphone, audio data representing the speech input; and wherein determining that the instruction is associated with operating a secondary device further comprises:
      sending the audio data to one or more remote devices and via the wireless network interface; and
      receiving, from the one or more remote devices and via the wireless network interface, second data indicating that the audio data represents the instruction associated with operating the secondary device.

3. The front-panel module of claim 1, the acts further comprising:
   determining that a component of the power module is to be reset; and
   sending, via the hardware interface, a reset signal indicating that the component of the power module is to be reset.

4. The front-panel module of claim 1, wherein the communication protocol comprises at least one of:
   a Serial Peripheral Interface (SPI) protocol; or
   an Inter-Integrated Circuit (I2C) protocol.

5. The front-panel module of claim 1, wherein the input device comprises one of:
   a touch screen;
   a camera;
   a microphone;
   a motion sensor; or
   a proximity sensor.

6. A power module comprising:
   one or more processors;

one or more of a magnetic isolation module or an optical isolation module to electrically isolate components of the power module from objects exterior the power module;

a hardware interface that couples the power module to a front-panel module, wherein the power module provides power to the front-panel module; and one or more computer-readable media storing computer-executable instructions that, when executed, cause the one or more processors to perform acts comprising:
receiving, from the front-panel module and via the hardware interface, and using a communication protocol, data indicating an instruction;
determining that the instruction is associated with operating a secondary device to which the power module is communicatively coupled; and
causing the secondary device to operate according to the instruction.

7. The power module of claim 6, wherein the communication protocol comprises at least one of:
a Serial Peripheral Interface (SPI) protocol; or
an Inter-Integrated Circuit (I2C) protocol.

8. The power module of claim 6, wherein the data is one or more encrypted packets, and the acts further comprising decrypting the one or more encrypted packets using one or more encryption keys to identify the instruction to cause the secondary device to operate.

9. The power module of claim 6, wherein:
the secondary device comprises an illumination device;
the instruction to cause the secondary device to operate comprises an instruction to dim the illumination device; and
causing the seconding device to operate comprises changing a duty cycle of a pulse-width modulation signal to control an amount of power supplied to the illumination device.

10. The power module of claim 6, the acts further comprising:
detecting, via the hardware interface, a reset signal from the front-panel module; and
causing a component of the power module to reset.

11. The power module of claim 6, wherein the one or more of the magnetic isolation module or the optical isolation module comprise:
a magnetic isolation module to electrically isolate a first component of the power module from the hardware interface; and
an optical isolation module to electrically isolate a second component of the power module from the hardware interface.

12. The power module of claim 6, wherein the secondary device comprises at least one of:
a thermostat;
an illumination device;
a security alarm;
an electrical outlet;
a dishwasher;
a fan; or
a heating device.

13. A front-panel module comprising:
a hardware interface that couples the front-panel module to a power module, wherein the front-panel module receives power from the power module;
a microphone;
one or more processors; and
one or more computer-readable media storing computer-executable instructions that, when executed, cause the one or more processors to perform acts comprising:
receiving, via the microphone, speech input indicating an instruction;
determining that the instruction is associated with operating a secondary device;
generating one or more packets including data that causes the power module to control the secondary device according to the instruction;
encrypting, using one or more encryption keys, the one or more packets to generate one or more encrypted packets; and
sending, to the power module, via the hardware interface, and using a communication protocol, the one or more encrypted packets.

14. The front-panel module of claim 13, wherein the communication protocol comprises at least one of:
a Serial Peripheral Interface (SPI) protocol; or
an Inter-Integrated Circuit (I2C) protocol.

15. The front-panel module of claim 13, wherein the secondary device comprises at least one of:
a thermostat;
a security alarm;
a dishwasher;
an illumination device;
a fan; or
a heating device.

16. The front-panel module of claim 13, wherein the front-panel module further comprises at least one of:
a touch screen;
a camera;
a motion sensor; or
a proximity sensor.

17. The front-panel module of claim 13, the acts further comprising:
determining that a component of the power module is to be reset; and
sending, via the hardware interface, a reset signal indicating that the component of the power module is to be reset.

* * * * *